United States Patent [19]
Johansson

[11] 3,892,896
[45] July 1, 1975

[54] PROCEDURE FOR SURFACE TREATMENT OF WOOD

[75] Inventor: Karl Ingvar Georg Johansson, Spanga, Sweden

[73] Assignee: Erik Gustav Lennart Eriksson, Valberg, Sweden

[22] Filed: Feb. 19, 1974

[21] Appl. No.: 443,415

Related U.S. Application Data

[63] Continuation-in-part of Ser. No. 193,544, Oct. 28, 1971, abandoned.

[52] U.S. Cl. ................................. 427/392; 21/7
[51] Int. Cl. .................................... B44d 1/16
[58] Field of Search ....... 117/57, 59, 62, 62.1, 62.2, 117/148, 116, 65.2; 21/7

[56] References Cited
UNITED STATES PATENTS

| | | | |
|---|---|---|---|
| 1,111,286 | 2/1914 | Aylsworth | 117/DIG. 3 |
| 2,190,672 | 2/1940 | Meharg | 117/DIG. 3 |
| 2,273,039 | 2/1942 | Hudson | 117/57 |
| 3,284,231 | 11/1966 | Shatizadeh | 117/57 |

FOREIGN PATENTS OR APPLICATIONS

| | | |
|---|---|---|
| 597,383 | 1/1948 | United Kingdom |
| 119,422 | 8/1947 | Sweden |
| 203,686 | 4/1966 | Sweden |
| 209,535 | 12/1966 | Sweden |
| 220,798 | 5/1968 | Sweden |
| 225,763 | 3/1969 | Sweden |

*Primary Examiner*—William R. Trenor

[57] ABSTRACT

A wood article is surface-treated by first pretreating the same with a condensable or polymerizable hydrophilic liquid monomer, substantially free of any solvent, in order to cause the wood to swell and/or to dissolve constituents of the wood. The resulting pretreated wood article is then directly treated with an impregnating agent, that reacts with such monomer, to form a condensate or polymerizate with the monomer. Finally, the impregnated condensate or polymerizate thus formed in the resulting treated wood is hardened.

10 Claims, No Drawings

PROCEDURE FOR SURFACE TREATMENT OF WOOD

This application is a continuation-in-part of my co-pending application Ser. No. 193,544 filed Oct. 28, 1971, now abandoned.

This invention relates to the surface-treatment of wood and is particularly concerned with the provision of an improved procedure for imparting a desired finish or texture to a wood surface.

In the production of wood articles of various types, it is frequently desirable or necessary that one or more of the surfaces of such an article possess increased durability. More especially, where such an article is to be exposed or otherwise subjected to considerable wear, it is essential that such surface or surfaces have adequate abrasion-resistance so that the article can be economically and satisfactorily utilized for the indicated purpose.

Improved resistance to abrasion can be imparted to a wooden surface by impregnating such surface with a treating agent or composition comprising a suitable synthetic resin or synthetic resin-forming condensate or polymerizate, which can thereafter be hardened in situ to produce the desired surface effect. This procedure can be more or less satisfactorily employed in those cases where the wood of which the article is made is readily penetrable. Problems in obtaining an adequate degree of penetration are encountered, however, with those woods that are relatively more difficult to penetrate even when the treating agent or composition is applied under pressure.

To overcome this difficulty, it is customary to pretreat the wood surface with a substance that facilitates the subsequent penetration of the desired impregnating or treating agent or composition. The effect of such pretreatment is generally to cause the wood to swell and/or to cause various constituents of the wood to be dissolved or otherwise broken down, thereby rendering the wood more readily penetrable by and accessible to such treating agent.

In carrying out such pretreatment, two basic approaches have been utilized; either the pretreating substance has been utilized per se, or it has been employed in the form of a solution. Where such a solution is used, it becomes necessary to remove the solvent, which may be water or an appropriate organic liquid, from the pretreated wood surface as by drying or otherwise prior to the application to such surface of the impregnating or treating agent. Moreover, in either event it also becomes necessary to remove the pretreating substance from the pretreated wood, as by washing or otherwise, prior to the application of the impregnating agent to such pretreated wood so that the impregnating agent can fill up the pretreated wood as completely as possible.

Among the substances proposed and/or utilized for such pretreatment purpose are various alkali or alkaline materials, which act on the wood structure in such a manner as to render the same more readily penetrable by the impregnating agent. Other proposals have involved the dissolution of one or more wood ingredients such as lignin or resins as by the use of acidic water vapor or an acidified aqueous sodium chlorite solution. As pointed out above, all such proposals require the removal, in some way or other, of such pretreating agent.

It has now been found that the disadvantages of such prior procedures can be avoided by utilizing as the pretreating agent a condensable or polymerizable hydrophilic liquid monomer material that not only causes the wood to swell and/or dissolves certain constituents of the wood but also reacts with the subsequently applied impregnating agent to form the desired condensate or polymerizate within the resulting treated wood. Since such monomer material thus becomes part of the resulting condensate or polymerizate, it is no longer necessary to remove such pretreating agent from the pretreated wood. In addition, the monomer material being utilized as a liquid or in liquid form, the requirement for the removal of a solvent from the pretreated wood is also eliminated.

This objective is achieved in accordance with the invention by pretreating a wood article or other wood substrate with the condensable or polymerizable hydrophilic liquid monomer material in the absence or substantial absence of any solvent, such pretreatment being continued until the surface of such substrate has been penetrated to a depth appropriate for the desired purpose. Thereafter, the pretreated wood article is treated with a suitable impregnating agent or composition, reactive with such monomer material, until condensation or polymerization of such agent with the monomer material has been effected. The impregnated condensate or polymerizate thus formed within the resulting treated wood is then hardened.

The material utilized to pretreat the wood substrate may comprise any suitable monomeric substance that is hydrophilic and that causes the wood to swell or dissolves certain constituents of the wood so long as it is condensable or polymerizable with the impregnating agent subsequently applied to such substrate. In addition, such substance must be of such a nature that it can be utilized in liquid form; that is, it should be liquid at the conditions under which the pretreatment is carried out so that no solvent, aqueous or organic, need be employed in order to permit its use. Where the monomeric substance is solid at ordinary temperatures, the pretreatment must be effected at a temperature sufficiently high to liquefy such substance.

Of such monomeric substances that can be so utilized, the phenols are admirably suited. While elevated temperatures are necessary in order to render the phenols liquid, such temperatures are still relatively low so that, in general, the wood article or substrate is not deleteriously affected thereby. The phenols also readily dissolve or otherwise attack various constituents of the wood so that the wood becomes more easily penetrable by the subsequently applied impregnating agent. Moreover, the phenols are readily condensable or polymerizable with various types of impregnating agents.

Especially suitable for the present purpose are phenol per se and resorcinol. Like the other phenols, phenol per se and resorcinol may be utilized alone or in combination with small amounts of additives to increase their effectiveness. For example, a small amount of a strong mineral acid such as $H_2SO_4$ renders the phenol more effective in breaking down lignin, the resulting products of which, however, remain in the wood and participate in the formation of the ultimate hardened condensate or polymerizate. Again, the addition of a small amount of a reducing agent such as stannous chloride counteracts the tendency of the phenolic condensates and polymerizates to undergo brown-staining.

Other monomeric substances that can be employed for such wood-pretreatment comprise various glycols and amines. Like the phenols, such glycols and amines basically penetrate the surface of the wood only.

The extent of penetration of the liquid monomer material into the surface of the wood article or substrate and the time required to accomplish such penetration are governed not only by the ultimate purpose for which such article or substrate is to be utilized but also by the nature of the wood itself. Pressure conditions may, of course, be employed to increase the extent of penetration and/or the rate of penetration, which are also affected to some extent by the temperature of pretreatment. Generally speaking, adequate penetration is achieved with pretreatment at a temperature of up to about 120°C., preferably between about 90°C. and 120°C., for a time period of up to about 3 hours. For example, when pine is pretreated at such a temperature, a penetration to a depth of about 2 to 3 mm. occurs in about 1 hour and to a depth of about 5 mm. in about 3 hours.

The impregnating agent or composition may comprise any suitable material or substance that reacts with the monomer material to provide a condensate or polymerizate which, when hardened in situ, imparts the desired characteristics or properties to the finished wood article. Application of the impregnating agent may be effected under varying temperature and/or pressure conditions in accordance with the nature of the impregnating agent itself, the type of wood being impregnated, and the purpose for which the ultimate finished article is designed. The time required for such impregnation is governed by the same factors as well as by the extent to which the condensation or polymerization is to be carried.

Where a phenol is utilized as the pretreating agent, it has been found desirable to carry out such impregnation at or about room temperature with the use of pressure if desired. Although various types of impregnating agents or compositions may be utilized under such circumstances, the use of a previously coalesced mixture of phenol and paraformaldehyde, which may contain an alkaline hardener, has been found particularly effective. Other appropriate impregnating agents and compositions suitable for such condensation or polymerization include hexamethylene tetramine in aqueous solution and an aqueous solution of melamine formaldehyde.

When a glycol is used as the pretreating agent, the impregnating agent may comprise a di-isocyanate, which condenses with the glycol to form a polyurethane. An epoxy resin may be used as the impregnating agent when the pretreating agent comprises an amine, in which case an epoxy plastic is formed.

Hardening of the impregnated condensate or polymerizate formed within the resulting treated wood may be conducted in any of various ways. Advantageously, however, such hardening is carried out by suitable heating of the treated wood article or substrate, such heating being conducted as a single-stage operation or as a multi-stage operation as appropriate. The temperature utilized for such heat-hardening and the duration of such heat-treatment are determined, among other factors, by the nature of the condensate or polymerizate and by the type of use to which the finished article is to be subjected.

Where such heating is done in a single stage, the resulting treated wood may be placed for the appropriate length of time in a suitable oven or the like maintained at a constant temperature. Alternatively, such treated wood may be placed in a hot press provided with glazing plates, matte-finishing plates, or other plates in accordance with the finish desired. The treated wood may also be heated in an oven in which the temperature is gradually increased over a preselected range. Such oven treatment may be carried out, when the pretreating agent comprises a phenol, at a temperature generally within the range of about 80°C. to about 140°C.

As indicated above, this heating operation may be carried out in two or more stages. For example, the resulting treated wood may be heated at one temperature in an oven or the like until a predetermined degree of hardening of the impregnated condensate or polymerizate has been accomplished; and such partially heat-treated wood article may then be placed in a hot press operated at a higher temperature until the desired degree of hardening has been completed. Where a phenol is utilized as the pretreating agent, the first step of such a two-stage procedure may be effected at a temperature between about 80°C. and about 140°C.; and the second step may be conducted in a hot press at a higher temperature between about 130°C. and about 180°C.

Hardening of such impregnated condensate or polymerizate can also be accomplished without heating especially where the maximum degree of hardness in the finished article is not required. The time necessary to achieve the desired degree of hardness in such case will, of course be greater.

As will be appreciated, the end surfaces of a wood substrate are of such a nature that they tend to absorb liquid materials at a faster rate than the remaining surfaces. Such rate can be reduced, if desired, by suitably treating such end surfaces to render them less readily permeable to the pretreating agent. For example, where a phenol is utilized to effect the pretreatment, the end surfaces can be preliminarily treated with an end-sealing agent that condenses or polymerizes with the phenol during such pretreatment, with the resulting formation on the end surfaces of a condensate or polymerizate insoluble in the phenol. Suitable end-sealing agents in such case include an aqueous solution of a melamine resin or hexamethylene tetramine.

The present invention thus provides a simplified procedure for surface-treating wood articles or other wood substrates. The necessity to remove the pretreating agent prior to the application of the impregnating agent has been elminated, as has the requirement to similarly remove the solvent that is customarily otherwise present after such pretreatment.

Moreover, the monomer material that is utilized as the pretreating agent becomes part of the impregnated condensate or polymerizate. Thus, only substances that become active in the desired impregnation of the wood substrate are used in the pretreatment step. In addition, any decomposed or dissolved lignin and other wood constituents essentially remain in the wood substrate and thereby participate in the formation of the resulting impregnated condensate or polymerizate so that no real loss of wood substances occurs. Finally, the present procedure is readily adaptable for large-scale commercial operation.

The invention will now be illustrated by the following examples.

EXAMPLE 1

A 50% aqueous solution of a melamine resin is applied to the ends of pieces of sprucewood, which are then left to dry. Pretreatment of the entire pieces of wood with molten phenol at 100°C. for 2 hours results in a depth of penetration of 1 to 2 mm., and at the same time the melamine resin on the end surfaces is hardened into a phenol-insoluble melamine resin which prevents any appreciable penetration of phenol into the ends of the wood. On the other hand the phenol penetrates into the other surfaces and impregnates them. After the so-pretreated pieces have been removed from the phenol bath, they are treated with hexamethylene tetramine in a nearly saturated aqueous solution (approximately 40% by weight) at room temperature for about 2 hours. After drying of the wood, hot-pressing is done at about 140°C. for 30 minutes at a gauge pressure of 1.5 kg/cm$^2$, which produces a reasonably hard, glossy and water-repellent surface.

EXAMPLE 2

After sealing of the ends as in the preceding example, panelboards of spruce are treated for about 3 hours at 90°C. with molten phenol containing about 0.2% sulphuric acid. This results in a depth of penetration of about 1 to 2 mm. The acid content gives the phenol a delignifying effect, which increases the depth and rate of penetration. Impregnation is done with a 1:1 to 2:1 mixture of phenol and paraformaldehyde, which have previously been caused to coalesce into a clear liquid, with the addition of NaOH to a pH of around 8.5, at room temperature for about 1 hour at a gauge pressure of 5 to 10 kg/cm$^2$. The pieces of panelling are thereafter hardened in an oven at 80° to 140°C. for 1 to 2 hours. Subsequent hardening is then done in a hot press at 130° to 180°C. for 5 to 20 minutes, during which time the later-visible panel surface is placed against a glazing plate, a matte-finishing plate, or the like. This provides a fairly light-colored panel surface. If a stained panel is desired, stain is added to the impregnating mixture.

EXAMPLE 3

A saturated aqueous solution of hexamethylene tetramine is applied to the ends of pieces of deal. Through treatment at 110°C. with molten phenol containing about 0.5% stannous chloride (SnCl$_2$) for about 1 hour, the phenol penetrates about 2 mm. into surfaces not treated with hexamethylene tetramine. At the treated end surfaces the hexamethylene tetramine reacts with the phenol and forms a phenolic resin insoluble in phenol. Subsequent impregnation is then done at room temperature with a mixture of phenol and paraformaldehyde for about 1 hour in an autoclave at about 5 atmospheres gauge pressure. The hardening is done in the same way as in the preceding example, the resulting wood surfaces being fairly light-colored.

EXAMPLE 4

The ends of sprucewood are sealed as in Example 3. The pieces of spruce are then pretreated solely with resorcinol at about 120°C. for 1 hour, resulting in a depth of penetration of about 1 mm. After the resorcinol treatment, the pretreated pieces of spruce are impregnated at room temperature with a highly concentrated aqueous solution of melamine formaldehyde at a pH of 8 to 9 to avoid self-hardening. A main hardening operation (about 90%) is then done in a heating oven, as in Example 2, at about 80° to 140°C., followed by subsequent hardening at a higher temperature, i.e., about 130° to 180°C. in a hot press with a glazing plate, a matte-finishing plate, or the like, through which the wood is given the desired finish.

What is claimed is:

1. A process for the surface-treatment of wood, which comprises pretreating the wood at a temperature below about 120°C for about 1–3 hours with a condensable or polymerizable hydrophilic liquid monomer material, that is substantially free of any solvent and that causes the wood to swell or dissolves constituents of the wood, until the desired depth of penetration of the substrate surface has been attained; thereafter at room temperature treating the resulting pretreated wood with an impregnating agent, that reacts with said monomer material, for a time sufficient to condense or polymerize the same with said monomer material; and then hardening the impregnated condensate or polymerizate thus formed in the resulting treated wood, hardening being accomplished by first heating the impregnated wood to a temperature of about 80°C to about 140°C, followed by hot-pressing at a temperature of about 130°C to about 180°c.

2. A process for the surface-treatment of wood, which comprises pretreating the wood at a temperature below about 120°C for about 1–3 hours with phenols in liquid form, said phenols being substantially free of any solvent, until the desired depth of penetration of the substrate surface has been attained; thereafter treating the resulting pretreated wood at room temperature with an impregnating agent, that reacts with said phenols, for a time sufficient to condense or polymerize the same with said phenols; and then heating the resulting treated wood until the desired degree of hardening of the thus-formed impregnated condensate or polymerizate has been effected.

3. A process according to claim 2, in which the wood substrate is pretreated with the said phenols at a temperature between about 90°C. and about 120°C.

4. A process according to claim 2, in which phenol is used and the impregnating agent comprises a previously coalesced mixture of phenol and paraformaldehyde.

5. A process according to claim 2, in which resorcinol is used, and the impregnating agent comprises a previously coalesced mixture of phenol and paraformaldehyde.

6. A process according to claim 2, in which the end surfaces of the wood substrate are preliminarily treated with an end-sealing agent that condenses or polymerizes with said phenols during the pretreatment of the substrate to form on the so-treated end surfaces a condensate or polymerizate insoluble in said phenol.

7. A process according to claim 2, in which said phenols includes a small amount of a strong mineral acid.

8. A process according to claim 7, in which the strong mineral acid comprises H$_2$SO$_4$.

9. A process according to claim 2, in which said phenols includes a small amount of a reducing agent.

10. A process according to claim 9, in which the reducing agent comprises SnCl$_2$.

* * * * *